United States Patent [19]

Erickson et al.

[11] Patent Number: 5,509,496

[45] Date of Patent: Apr. 23, 1996

[54] LAWN AND GARDEN TRACTOR HYDROSTATIC FOOT CONTROL SYSTEM

[75] Inventors: Donald G. Erickson, Antioch; Joseph P. Deschamps, Franklin; Lindell R. Flynn, Old Hickory; John A. Burns, Franklin; Richard D. Williams, Brentwood, all of Tenn.

[73] Assignee: Murray, Inc., Brentwood, Tenn.

[21] Appl. No.: 255,966

[22] Filed: Jun. 7, 1994

[51] Int. Cl.⁶ .................................................. B60K 17/00
[52] U.S. Cl. ........................ 180/307; 180/336; 180/273; 74/474
[58] Field of Search ..................... 180/242, 273, 180/315, 326, 329, 330, 331, 333, 336, 19.1, 19.2, 19.3, 307, 308; 74/474; 60/464, 468

[56] References Cited

U.S. PATENT DOCUMENTS

| | | | |
|---|---|---|---|
| Re. 27,813 | 11/1973 | Haffner | 74/474 |
| 2,483,224 | 9/1949 | Narcovich | 74/478 |
| 2,774,436 | 12/1956 | Ferris | 180/307 |
| 2,904,957 | 9/1959 | Quayle | 60/393 |
| 2,968,967 | 1/1961 | Ross, Jr. | 477/121 |
| 3,250,340 | 5/1966 | Roberson | 180/242 |
| 3,259,203 | 7/1966 | Ryskamp | 180/273 |
| 3,316,773 | 5/1967 | Findlay | 74/481 |
| 3,354,027 | 11/1967 | Hossain et al. | 162/5 |
| 3,354,981 | 11/1967 | Swanson et al. | 180/333 |
| 3,376,703 | 4/1968 | Buczynski | 180/273 |
| 3,505,896 | 4/1970 | Phillips | 74/481 |
| 3,507,117 | 4/1970 | Lauck | 60/328 |
| 3,525,266 | 8/1970 | Brooks et al. | 74/481 |
| 3,541,878 | 11/1970 | Haffner | 74/474 |
| 3,602,062 | 8/1971 | Houk et al. | 74/481 |
| 3,691,863 | 9/1972 | Shaffer | 74/478 |
| 3,722,314 | 3/1973 | Sorenson et al. | 74/512 |
| 3,823,792 | 7/1974 | Dinkloh et al. | 180/14.3 |
| 3,868,003 | 2/1975 | Smith | 74/474 |
| 3,898,891 | 8/1975 | Colloton | 74/474 |
| 3,919,896 | 11/1975 | Foster | 74/474 |
| 3,952,512 | 4/1976 | Feller | 60/431 |
| 3,995,510 | 12/1976 | Yost | 74/478.5 |
| 4,010,657 | 3/1977 | Amdall | 74/478 |
| 4,011,768 | 3/1977 | Tessenske | 74/479 |
| 4,040,306 | 8/1977 | Jensen et al. | 74/334 |
| 4,061,051 | 12/1977 | Grandis | 74/474 |
| 4,064,769 | 12/1977 | Amdall et al. | 74/878 |
| 4,086,823 | 5/1978 | Fatur | 74/474 |
| 4,092,876 | 6/1978 | Povejsil | 74/478 |
| 4,106,362 | 8/1978 | Hildebrecht | 74/474 |
| 4,109,546 | 8/1978 | Povejsil | 74/474 |
| 4,125,032 | 11/1978 | Shuler | 74/96 |
| 4,156,369 | 5/1979 | Brown et al. | 74/474 |

(List continued on next page.)

Primary Examiner—Margaret A. Focarino
Assistant Examiner—Paul N. Dickson
Attorney, Agent, or Firm—Cushman Darby & Cushman

[57] ABSTRACT

A mechanism for controlling the direction and speed of an off-road vehicle having a frame, an operator seat, a steering wheel, an engine and a variable speed transmission coupled for driving at least one of a plurality of ground wheels. The mechanism comprises a floor plate carried by the vehicle for receiving the heel portion of an operator's foot, a pedal operatively connected to the variable speed transmission and pivotally mounted above the floor plate for movement between a forward zone for controlling the forward speed of the vehicle, a neutral zone wherein the vehicle is in neutral, and a reverse zone for controlling the reverse speed of the vehicle. The pedal has first and second portions generally inclined with respect to one another and each are adapted for engagement by a forward portion of the individual's foot so that engagement of the first portion with a predetermined amount of force moves the pedal into the forward zone of movement, and engagement with the second portion with a predetermined amount of force moves the pedal into the reverse zone of movement. The pedal is arranged relative to the floor plate in a manner which enables the individual to selectively access the first and second portions with the forward portion of the foot by pivoting the heel on the floor plate. The pedal has at least the second portion thereof disposed outboard of a side edge of the floor plate.

19 Claims, 4 Drawing Sheets

U.S. PATENT DOCUMENTS

| | | | |
|---|---|---|---|
| 4,156,370 | 5/1979 | Callaghan | 74/481 |
| 4,179,949 | 12/1979 | Hildebrecht | 74/474 |
| 4,237,752 | 12/1980 | Hildebrecht | 74/878 |
| 4,245,527 | 1/1981 | Hildebrecht | 74/874 |
| 4,301,902 | 11/1981 | Gatsos et al. | 192/11 |
| 4,352,302 | 10/1982 | McCauliffe et al. | 74/474 |
| 4,496,035 | 1/1985 | Wanie | 192/4 C |
| 4,516,439 | 5/1985 | Sagaser | 74/470 |
| 4,523,489 | 6/1985 | Gault | 74/474 |
| 4,543,850 | 10/1985 | Bednar et al. | 74/512 |
| 4,608,879 | 9/1986 | Ishida | 74/474 |
| 4,883,137 | 11/1989 | Wanie et al. | 180/6.34 |
| 4,955,249 | 9/1990 | Wetor | 74/473 R |
| 4,977,760 | 12/1990 | Ishimori et al. | 60/444 |
| 5,022,477 | 6/1991 | Wanie | 180/6.34 |
| 5,048,638 | 9/1991 | Duncan et al. | 180/307 |
| 5,052,511 | 10/1991 | Hunt | 180/307 |
| 5,094,326 | 3/1992 | Schemelin et al. | 192/363 |
| 5,207,289 | 5/1993 | Wilmo | 74/474 |

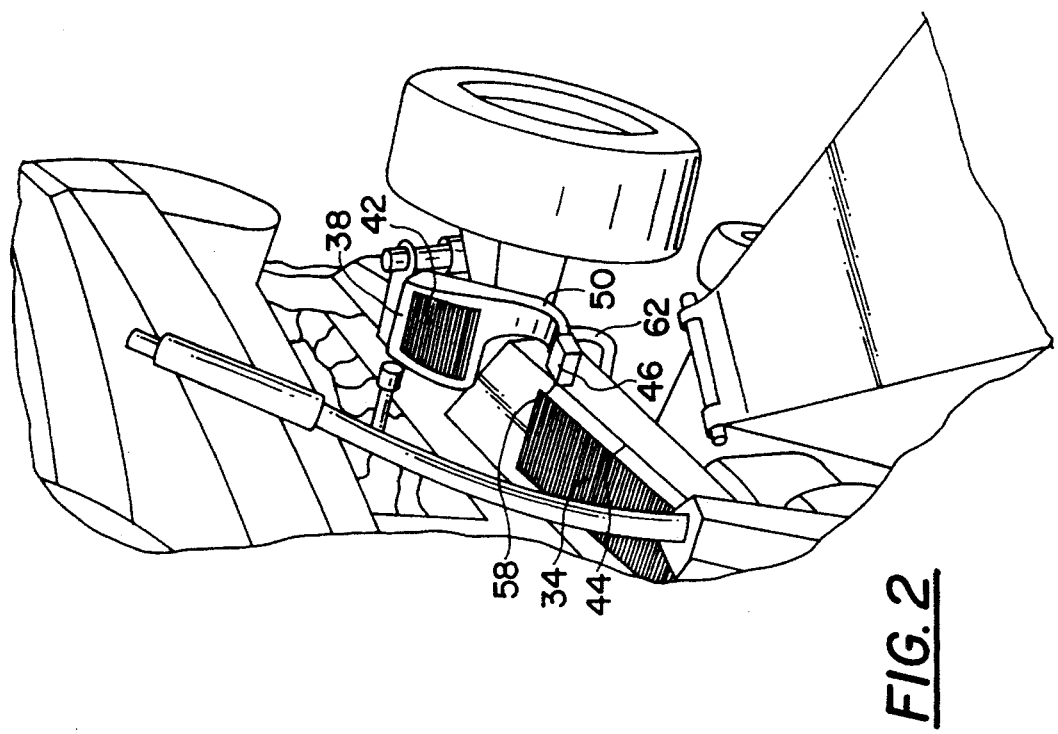
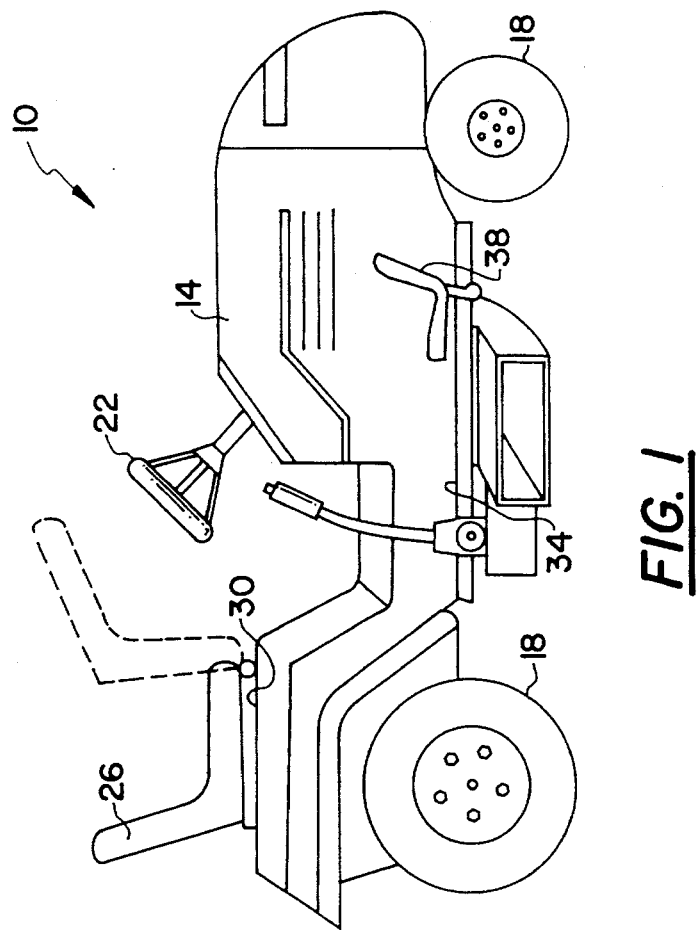
FIG. 2
FIG. 1

LAWN AND GARDEN TRACTOR HYDROSTATIC FOOT CONTROL SYSTEM

BACKGROUND OF THE INVENTION

The present invention relates to off-road vehicles and, more particularly, to improvements in hydrostatic transmission and foot pedal controls for lawn and garden tractors and mowers.

Off-road vehicles of the prior art commonly employ two foot pedals, one foot pedal being used for a forward mode of vehicle travel and the other being used for a reverse mode of vehicle travel. In other arrangements, the prior art also employs a single foot pedal which can be utilized for both forward and reverse modes of operation of the vehicle. In the latter instance, such a foot pedal is pivotally mounted at a generally central portion thereof and can be pivoted i) for forward operation of the vehicle by an individual depressing a forward portion of the pedal with a forward portion of his or her foot, or ii) for reverse operation of the vehicle by being depressed at a rearward portion thereof by the operator's heel. The single foot pedals are also normally biased into a neutral central position to maintain the vehicle in neutral when the operator's foot is removed from the pedal.

A problem associated with the aforementioned single foot pedal type arrangement is that it may be uncomfortable for the operator to maneuver the pedal through its full range of motion. That is, the natural range of pivoting motion of an individual's foot about the ankle is normally not great enough to accommodate the required range of pivotal motion of the foot pedal. In addition, the various surfaces of the pedal which must be engaged by the operator's foot are oftentimes arranged, positioned or angled in a manner which makes it awkward for the operator to operate. Another problem associated with such pedals is that debris, snow, mud, or the like, may become wedged between the vehicle floor plate, above which the pedal is mounted, and the underside of the pedal. As can be appreciated, any such substance which accumulates between the floor plate and foot pedal can have an adverse effect on pedal operation, especially in the reverse mode of vehicle operation.

It is therefore an object of the present invention to overcome the aforementioned problems. The present invention accomplishes this object by providing a mechanism for controlling the direction and speed of an off-road vehicle comprising a floor plate carried by the vehicle for receiving the heel portion of an operator's foot, and a pedal operatively connected to a variable speed transmission and pivotally mounted for movement between a forward zone for controlling the forward speed of the vehicle, a neutral zone wherein the vehicle is in a neutral mode, and a reverse zone for controlling the reverse speed of the vehicle. The pedal has first and second portions generally inclined with respect to one another and each are adapted for engagement by a forward portion of the individual's foot so that engagement of the first portion with a predetermined amount of force moves the pedal into its forward zone of movement, and engagement of the second portion with a predetermined amount of force moves the pedal into its reverse zone of movement. The pedal is arranged relative to the floor plate in a manner which enables the individual to selectively access the first and second portions with the forward portion of the foot by pivoting the heel of the foot on the floor plate, the pedal having at least the second portion thereof disposed outboard of a side edge of the floor plate.

Another problem that exists in such single pedal arrangements lies in their ability to smoothly and accurately return to the central neutral position after the operator removes his or her foot from the pedal. That is, in some instances, the centering mechanism of the foot pedal assembly of an off-road vehicle does not precisely locate and establish the hydrostatic transmission's neutral position (as determined by a hydrostatic transmission speed control input shaft to which the pedal is operatively connected), thus resulting in slight ground movement or creep in either the forward or reverse directions when the operator releases the pedal. In addition, there also exists a problem in that after the operator releases the pedal, the centering mechanisms of the prior art have a tendency to return the pedal to the central neutral position too quickly, thereby resulting in a jerking stoppage of the vehicle.

It is, therefore, another object of the invention to solve these problems by providing a control linkage for an input control of the input shaft of a hydrostatic transmission, the input shaft being rotatable between forward, neutral and reverse positions, the control linkage normally maintaining the input shaft in the neutral position. The control linkage comprises an anchor brace, a lever connected to and pivotable about the control input shaft such that pivotal movement of the lever translates into rotational movement of the control input shaft, and a coil spring connected to the anchor brace and the lever. The connections between the coil spring and the anchor brace, the coil spring and the lever, and the control input shaft and the lever all lie in a single plane substantially parallel to a longitudinal axis of the input shaft when the shaft is in its neutral central position. At least one of the connections diverges away from the single plane as the input shaft diverges away from the neutral central position towards either the forward or reverse positions.

Another aspect of the present invention relates to a hydrostatic transaxle check valve normally provided in the aforementioned hydrostatic transmission type vehicles. Such check valves are used in switching the transaxle (or in a broader sense the vehicle as a whole) between a "drive" mode and a "push" mode. In the drive mode, the check valve is closed, and the hydrostatic transmission is hydrostatically locked to prevent the vehicle from moving when the vehicle motor is turned off. In the push mode, the check valve opens to permit the hydrostatic system to be in open flow and permit the vehicle to be manually pushed either in the forward or reverse directions. In the tractor and mower industry, there has been a need for a simple and inexpensive yet effective means for switching the hydrostatic transaxle check valve between the drive and push modes.

To meet this need, the present invention provides a switching mechanism for a hydrostatic transaxle check valve of an off-road vehicle, the off-road vehicle having a frame, a console, an operator seat, a steering wheel, an engine and a variable speed transmission coupled for driving at least one of a plurality of ground wheels. The hydrostatic check valve is push-button switchable between its opened and closed positions to convert the vehicle between its push and drive modes respectively. The switching mechanism comprises an operating rod movable between first and second positions. The switching mechanism has a manually engageable portion at a first end thereof, which manually engageable portion is normally disposed exteriorly of the console and beneath the seat. The seat is pivotable to permit manual access to the manually engageable portion. A cam member is provided and rotatable about an axis. The cam member has an eccentric portion capable of operational engagement with the push-button for switching the hydrostatic check valve between the opened and closed positions. In addition, a biasing member operatively couples the operating rod and the cam member, so that movement of the operating rod between the first and second positions causes rotation of the cam member in a manner which forces the eccentric portion into operational engagement with the push-button for switching the hydrostatic check valve between the opened and closed positions.

Other objects and advantages of the invention will be apparent from the following description, the accompanying drawings, and the appended claims.

BRIEF DESCRIPTION OF THE DRAWINGS

FIG. 1 is a side view of the off-road vehicle of the present invention.

FIG. 2 is a perspective view of the off-road vehicle of the present invention shown in part to highlight the pedal of the present invention.

Figure 3:
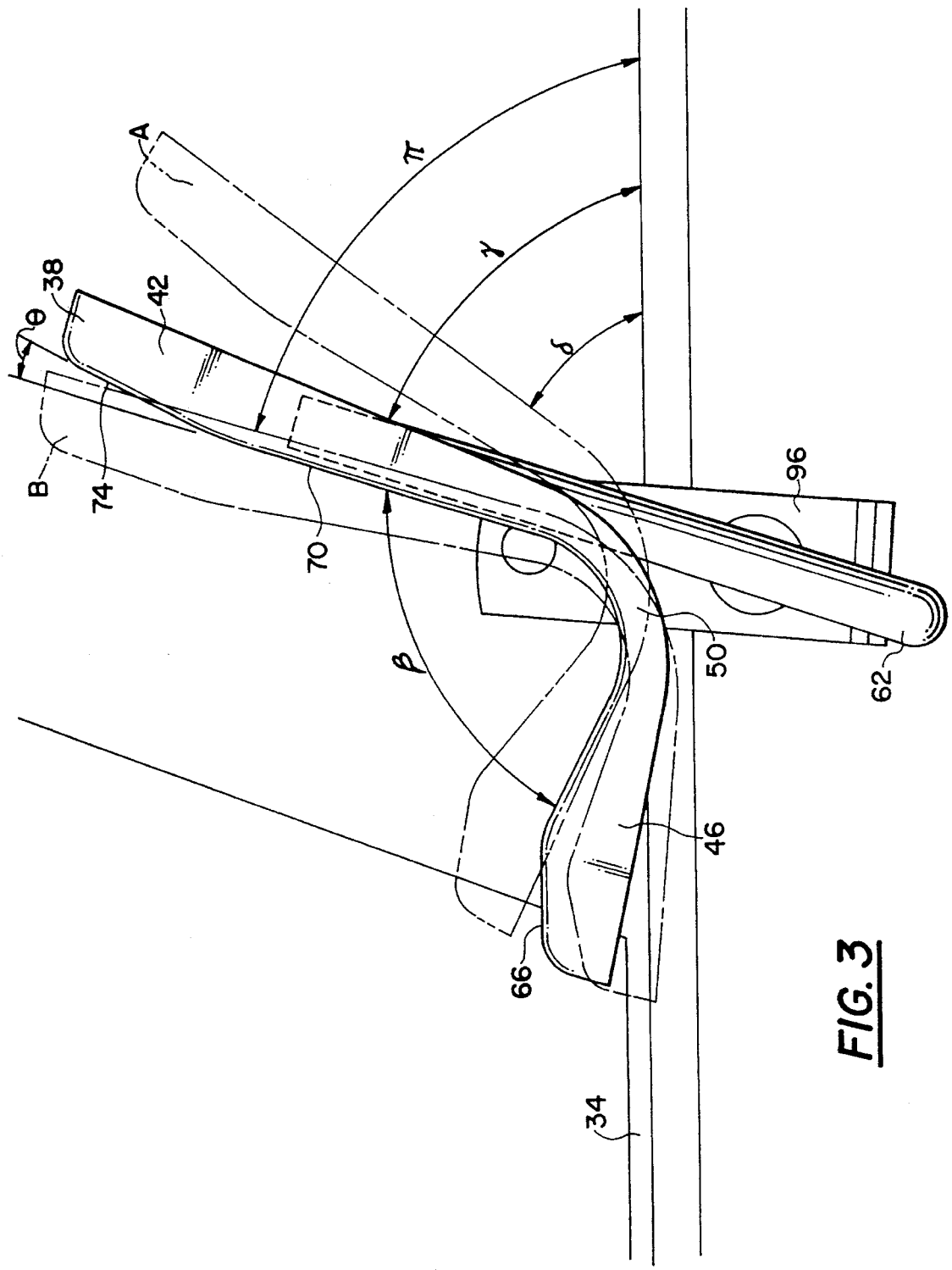
FIG. 3 is a side view showing the full range of motion of the pedal of the present invention.

Shown generally in FIG. 1 is the off-road vehicle 10 of the present invention. Here, the off-road vehicle shown is a ride-on lawn mower. The vehicle 10 includes an outer console 14 mounted on a vehicle frame (not shown). A plurality of groundwheels 18 are provided, and at least one of the ground wheels is operably connected to a hydrostatic transaxle so as to be rotatably driven to impart motion to the vehicle. Also provided is steering column 22 for controlling the front groundwheels as they guide the vehicle during movement. An operator seat 26 is mounted on top of console 14 and is pivotable to permit access therebeneath to a manually engageable portion of an operating rod 30, which forms part of the switching mechanism of the present invention. The switching mechanism will be described later in greater detail.

Below the console 14 is provided a floor plate 34, and disposed thereabove is a pedal 38 mounted for pivotal movement between a forward zone for controlling the forward speed of the vehicle, a neutral zone for placing the vehicle in a neutral condition, and a reverse zone for controlling the reverse speed of the vehicle 10. For the purposes of this application, it will be understood that the aforementioned three "zones" of movement can be used in referring not only to the range of movement of the pedal itself, but also to the range of movement of any movable component that changes its position as the variable speed transmission changes the direction and/or speed of the vehicle. The floor plate 34 and pedal 38 will now be described in more detail with reference to FIG. 2.

In FIG. 2, it can be seen that foot pedal 38 has a large upper first portion 42, and a relatively smaller second portion 46 disposed lower than the first portion. As can be discerned from FIG. 2, first portion 42 and second portion 46 are integral with one another through a bent portion 50, and first portion 42 and second portion 46 are thus generally inclined with respect to one another. As also can be discerned, the second portion 46 is disposed outboard of a side edge 44 of floor plate 34. That is to say, side edge 44 of floor plate 34 is transversely spaced from an innermost edge 58 of second portion 46 so that any debris, mud or the like which may accumulate on floor plate 34 will not interfere with downward movement of second portion 46 during operation of the foot pedal.

The foot pedal is normally biased generally into the position shown in FIG. 2. In operation, an individual sitting on the seat 26 rests his or her heel of the right foot (or left foot if the pedal is provided on the left side of the vehicle) on floor plate 34 and pivots the foot on the heel to selectively engage either the first portion 42 or the second portion 46 with a forward portion of the foot. When the operator applies pressure to the first portion 42, the foot pedal 38 pivots about pivot member 62 in a forward direction (clockwise in FIG. 1), which causes forward movement of the vehicle. On the other hand, when the operator's foot applies pressure to the second portion 46 of the foot pedal, the foot pedal pivots about pivot member 62 in a reverse direction (counterclockwise in FIG. 1) to cause reverse movement of the vehicle.

Turning now to FIG. 3, the full range of motion of foot pedal 38 is shown. It can be appreciated that in addition to controlling the direction (i.e. forward or reverse) of travel, the foot pedal can also be used to control the speed of the vehicle in those directions. For example, if first portion 42 is only slightly depressed, the vehicle will travel at a relatively slow forward speed, while increasing the amount that first portion 42 is depressed will translate into a corresponding increase in forward speed.

Foot pedal 38 is illustrated in its neutral position by the solid lines in FIG. 3. Phantom pedal A shows foot pedal 38 in its forwardmost position within its forward zone of movement, while phantom pedal B shows foot pedal 38 in its rearwardmost position within the reverse zone of travel. Angle $\gamma$ in FIG. 3 represents the angle formed between first portion 42 and the floor plate 34 when pedal 38 is in its neutral position. Preferably, angle $\gamma$ is between about 74° and 77°. Angle $\delta$ in FIG. 3 represents the angle between first portion 42 and floor plate 34 when pedal 38 is in its forwardmost position. Preferably, angle $\delta$ is between about 55° and 64°. Angle $\pi$ in FIG. 3 represents the angle formed between first portion 42 and floor plate 34 when pedal 38 is in its rearwardmost position. Preferably angle $\pi$ is between about 81° and 85°. The aforementioned angles have been established through ergonomic studies in order to achieve maximum comfort in operating the foot pedal for a wide variety of different sized individuals.

As shown in FIG. 3, an upper surface 66 of second portion 46 is substantially parallel to floor plate 34 when pedal 38 is in the neutral position. Another important feature of the present invention is that the first portion 42 of foot pedal 38 comprises a lower surface 70 extending generally upwardly from bent portion 50, and an upper surface 74 extending from lower surface 70. Lower surface 70 and upper surface 74 are generally inclined with respect to one another. Angle $\theta$ in FIG. 3 represents the angle between the planes defining the respective surfaces 70 and 74. Angle $\theta$ is preferably between 7°–15°, and most preferably between 9° and 11°. The lower surface 70 is adapted to be comfortably operated by an individual having a relatively small foot, while upper surface 74 is adapted to be comfortably operated by an individual having a relatively larger foot.

The angle between first portion 42 and second portion 46 of pedal 38 is generally represented by angle $\beta$ shown in FIG. 3, and is preferably between 80°–90°.

Figure 4:
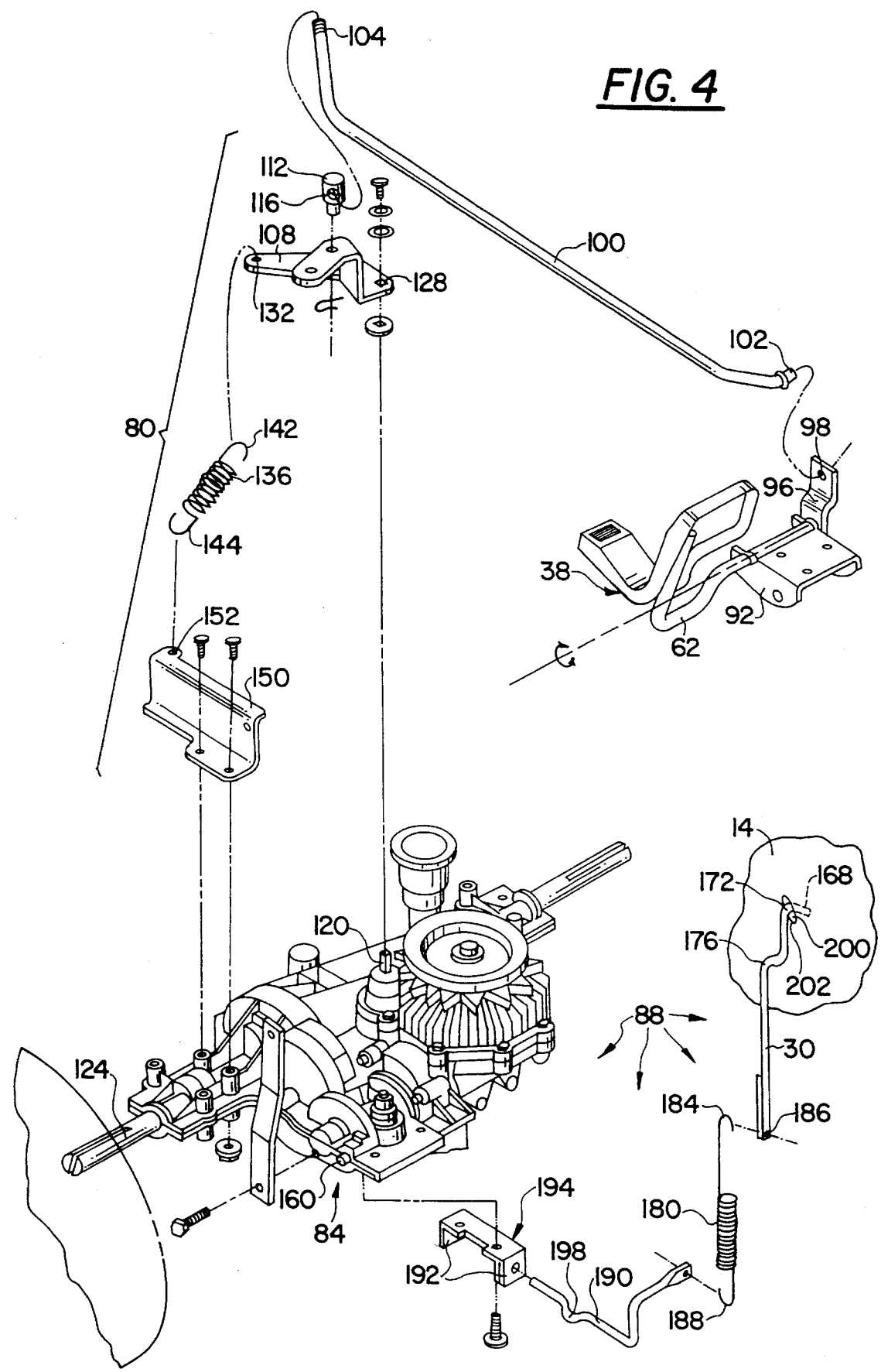
FIG. 4 is an exploded view of the hydrostatic drive system of the present invention.

FIG. 4 shows a hydrostatic drive system, including pedal 38, together with a centering assembly 80 (shown in exploded view), a hydrostatic transaxle 84, and a switching mechanism 88 (shown in exploded view) for switching a check valve of the hydrostatic transaxle between drive and push modes.

As shown, pedal 38 is mounted for pivotal movement about pivotal member 62, which extends through a bracket 92 to be mounted to the vehicle frame or console. On the opposite side of bracket 92, pivot member 62 terminates in a plate 96 fixed thereto. Plate 96 is rotatable about an axis C through a portion of pivot member 62 that extends through bracket 92. Plate 96 is provided with a hole 98 into which a first end 102 of an extension bar or control rod 100 is received for rotational movement relative to plate 96. The extension bar has a second end 104 functionally connected to a lever 108 through a receiving bolt 112. Second end 104 is preferably threaded and is received in a threaded opening 116 in receiving bolt 112.

Centering assembly 80 operationally connects pedal 38 to the hydrostatic transaxle 84. More, specifically, hydrostatic transaxle 84 is provided with a speed control input shaft 120 which is rotatable to control the direction and speed of rotation transmitted by the transaxle to an output shaft 124 thereof. The speed control input shaft 120 extends upwardly from the hydrostatic transaxle 84 and preferably has a polygonal transverse cross sectional shape. The speed control input shaft 120 is received in a correspondingly shaped opening 128 in lever 108.

Shaft 120 is normally biased into a neutral central position by a spring mechanism contained within hydrostatic transaxle 84 and not shown in the Figures. When the first portion 42 of pedal 38 is depressed by the operator, pivot member 62 causes plate 96 to move forwardly and bring extension bar or control rod 100 along therewith. Forward motion of extension bar or control rod 100 effectuates a counterclockwise rotation (as seen from a top view) of lever 108, which in turn translates such rotation to speed control input shaft 120. Counterclockwise movement of speed control input shaft 120 causes transaxle 84 to effectuate an appropriate rotation of output shaft 124 for forward movement of the vehicle. Similarly, depression of the second portion of pedal 38 causes rearward movement of extension bar or control rod 100 and a resultant clockwise rotation of lever 108 and input shaft 120 to effectuate reverse movement of the vehicle. It can further be appreciated that as speed control input shaft 120 is incrementally rotated in the clockwise or counterclockwise direction, the respective reverse or forward velocity of the vehicle is correspondingly incrementally increased. The amount of force required to depress the pedal 38 through either its forward or reverse zones of movement is dependent upon the strength of a centering coil spring of the centering assembly 80, which centering assembly will now described in greater detail.

When the operator releases his or her foot from first portion 42 or second portion 46 of the pedal, it is desirable for the input shaft 120 to automatically return to its precise central neutral position as quickly and smoothly as possible to effectuate a quick, yet smooth stoppage of the vehicle, without ground creep or jerking of the vehicle. While, as stated above, speed control input shaft 120 is biased into a central neutral position through an internal spring (not shown), the desired result is fully realized by centering assembly 80. The centering assembly includes lever 108, a coil spring 136, and an anchor brace 150. Lever 108 is provided with an opening 132 for receiving a first hooked end 142 of the coil spring 136 so as to form a connection between lever 108 and coil spring 136. Coil spring 136 has a second end 144 connected to an anchor brace 150 through opening 152. Anchor brace 150 is mounted on a portion of hydrostatic transaxle 84 with appropriate fasteners.

Figure 5:
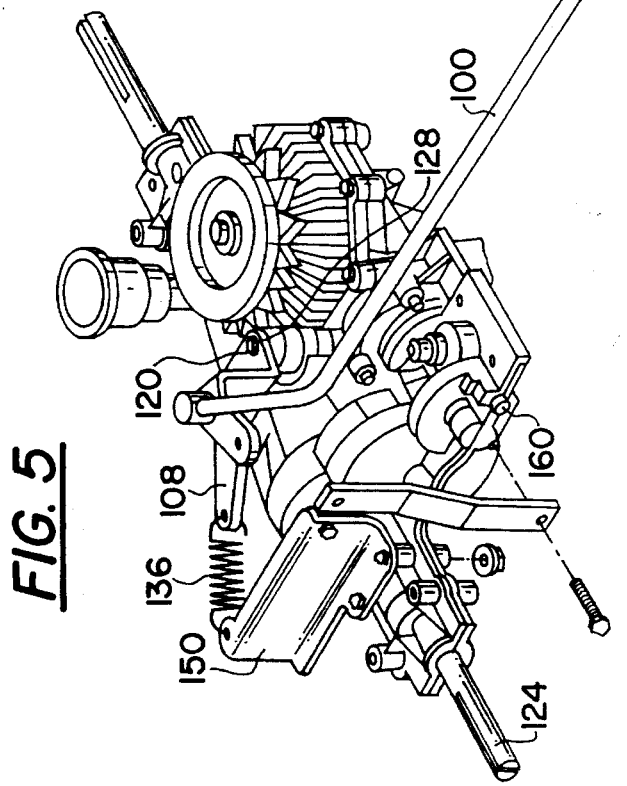
FIG. 5 is a perspective view of the hydrostatic drive system of FIG. 4.
Figure 5A:
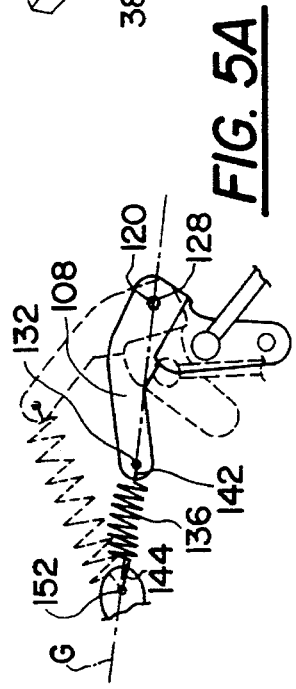
FIG. 5A is a top plan view of selected portions of the hydrostatic drive system shown in FIG. 5 to highlight the control linkage of the present invention.

The pedal and centering assembly of FIG. 4 are shown assembled in FIG. 5. Preferably, the three connections including the connection between second end 144 and opening 152, between first end 142 and opening 132, and between opening 128 and input shaft 120 are in substantial alignment with one another when input shaft 120 is in the neutral position. More specifically, in the neutral position, these connections lie in a single plane which is parallel to the longitudinal axis of input shaft 120. It is apparent that the longitudinal axis of input shaft 120 is not only parallel to such single plane, but also extends in said plane. This configuration is shown more clearly in FIG. 5A by the solid line drawings illustrating lever 108 and spring 136 in the neutral position. In FIG. 5A it can be discerned that a straight line G lies in the same plane as the aforementioned connections when the assembly is in the neutral position. In this position, coil spring 136 may be slightly extended while maintaining the speed control input shaft in its central neutral position. The phantom lines in FIG. 5A illustrate the lever 108 and spring 136 in the reverse zone of operation. In the reverse zone it can be appreciated that the aforementioned connections do not lie in the same plane and that coil spring 136 is incrementally stretched as the assembly progresses further into the reverse zone. The out of plane position of coil spring 136 and the force caused by stretching coil spring 136 imposes a moment about input shaft 120. The moment causes input shaft 120 to return to neutral position unless it is balanced by a force applied by the operator's foot on pedal 38.

Referring now back to FIG. 4, the switching mechanism 88 of the present invention can be seen in exploded view. The switching mechanism 88 is used to open and close an internal check valve of the hydrostatic transaxle. The check valve is opened and closed by depressing an activating button 160.

The switching mechanism includes an operating rod 30 which has a manually engageable portion 168 at one end thereof. Extending from the manually engageable portion is a first bent portion 172. Operating rod 30 further includes a second bent portion 176 spaced downwardly from first bent portion 172. The operating rod 30 terminates at its lower end in a connection with a coil spring 180. Coil spring 180 has a first hooked end 184 which is received in an opening 186 in the lower end of operating rod 30. A second hooked end 188 of coil spring 180 is connected to a cam member 190 which extends through side flanges 192 of a mounting bracket 194.

Figure 6:
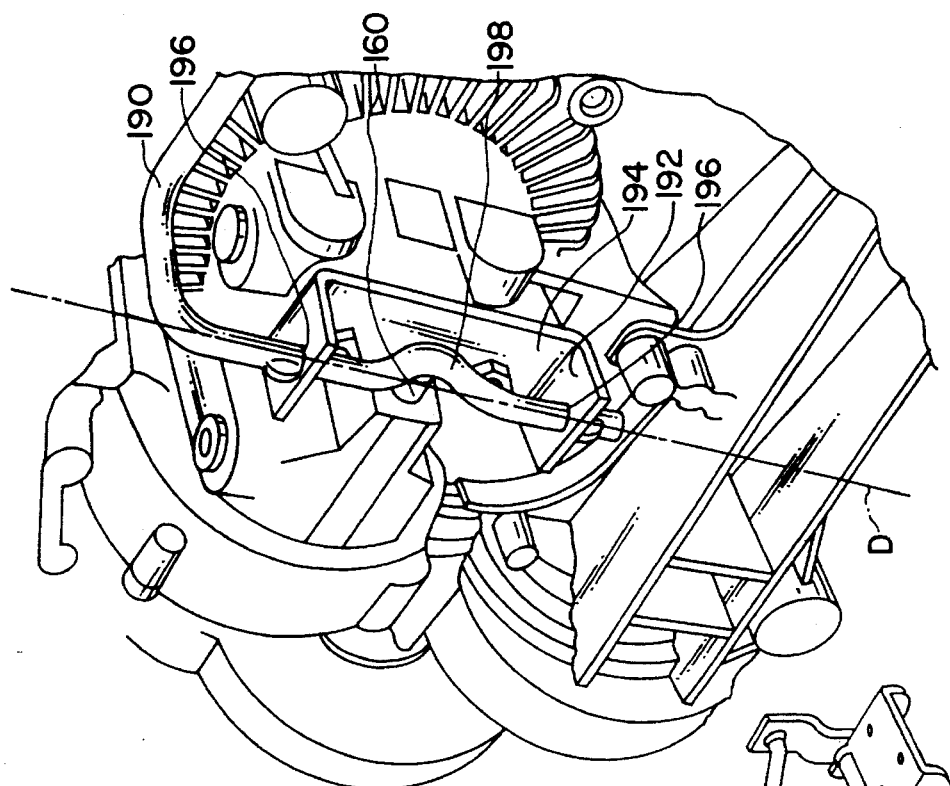
FIG. 6 is a perspective view of a portion of the switching mechanism of the present invention.

As shown more clearly in FIG. 6, mounting bracket 194 is mounted on the hydrostatic transaxle 84 and supports the cam member 190 in a manner which permits rotation thereof through an axis D defined by openings 196 in side flanges 192. Cam member 190 is provided with an eccentric portion 198 capable of depressing pushbutton 160 when cam member 190 is rotated about its aforementioned axis. Operation of pushbutton 160 switches the hydrostatic check valve between its closed and opened position to place the vehicle in the drive and push modes, respectively.

Referring back to FIG. 4, it can be seen that the rotation of cam member 190 is effectuated by moving operating rod 30 upwards and downwards. More specifically, while the majority of the switching mechanism is disposed within the console 14 of the vehicle, manually engageable portion 168 of the operating rod 30 normally extends through an opening 200 within the console 14 so as to permit manual engagement thereof. As shown in FIG. 4, opening 200 is defined by a peripheral edge 202, upon which first bent portion 172 rests. In this position, the eccentric portion 198 of cam member 190 is in slightly spaced relation from activating button 160, the check valve is closed, and the hydrostatic transaxle 84 is in the drive mode. Upon stoppage of the vehicle, the operator may manually pull portion 168 upwards and latch second bent portion 176 onto peripheral edge 202 of the console. As a result of this motion, eccentric portion 198 of the cam member is forced against pushbutton 160 to open the valve and place the hydrostatic transaxle into the push mode. As shown in FIG. 1, it is preferable that the operating rod 30 be disposed beneath the operator seat 26 so that it may only be accessed upon the operator dismounting the vehicle and pivoting operating seat 26 as shown.

It thus will be appreciated that the objects of this invention have been fully and effectively accomplished. It will be realized, however, that the foregoing preferred specific embodiment has been shown and described for the purpose of this invention and is subject to change without departure from such principles. Therefore, this invention include all modifications encompassed within the spirit and scope of the following claims.

What is claimed is:

1. A mechanism for controlling the direction and speed of an off-road vehicle having a frame, an operator seat, a steering wheel, an engine and a variable speed transmission coupled for driving at least one of a plurality of ground wheels, said mechanism comprising:

a floor plate carried by the vehicle and adapted to support the heel portion of an operator's foot;

a pedal operatively connected to said variable speed transmission and pivotally mounted for movement between a forward zone for controlling the forward speed of said vehicle, a neutral zone wherein said vehicle is in neutral, and a reverse zone for controlling the reverse speed of said vehicle;

said pedal having first and second portions generally inclined with respect to one another and each adapted for engagement by a forward portion of said individual's foot so that engagement of said first portion with a predetermined amount of force moves said pedal into said forward zone of movement, and engagement of said second portion with a predetermined amount of force moves said pedal into said reverse zone of movement;

said pedal being arranged relative to said floor plate in a manner which enables said individual to selectively access said first and second portions with the forward portion of said foot by pivoting said heel on said floor plate; and said pedal having said second portion thereof disposed laterally outboard of a side edge of said floor plate and having at least a portion Of said first portion thereof disposed laterally inboard of said side edge of said floor plate.

2. A mechanism as claimed in claim 1, wherein said first portion of said pedal has upper and lower surfaces generally inclined with respect to one another in such fashion so as to give said first portion a generally convex-like surface to be engaged by the forward portion of the foot.

3. A mechanism as claimed in claim 2, wherein said upper surface is disposed at an angle between the range of 7° and 15° with respect to said lower surface.

4. A mechanism as claimed in claim 1, wherein said first portion of said pedal is disposed at an angle between the range of 80° and 90° with respect to said second portion of said pedal.

5. A mechanism as claimed in claim 1, wherein said second portion is disposed generally parallel to said floor plate when said pedal is in said neutral zone.

6. A mechanism as claimed in claim 5, wherein said first portion is generally disposed at an angle between the range of 80° and 90° with respect to said floor plate when said pedal is in said neutral zone.

7. An off-road vehicle as claimed in claim 1, further comprising a centering assembly operatively connected to said pedal for normally maintaining said pedal in said neutral zone.

8. An off-road vehicle comprising:

a frame;

an operator seat mounted on said frame;

a plurality of ground wheels carried by said vehicle, at least one of said ground wheels capable of being rotatably driven for imparting movement to said vehicle;

a variable speed transmission coupled for rotatably driving said at least one of the ground wheels;

a floor plate carried by the vehicle and adapted to support the heel portion of an operator's foot;

a pedal operatively connected to said variable speed transmission and pivotally mounted for movement between a forward zone for controlling the forward speed of said vehicle, a neutral zone wherein said vehicle is in neutral, and a reverse zone for controlling the reverse speed of said vehicle;

said pedal having first and second portions generally inclined with respect to one another and each adapted for engagement by a forward portion of said individual's foot so that engagement of said first portion with a predetermined amount of force moves said pedal into said forward zone of movement, and engagement with said second portion with a predetermined amount of force moves said pedal into said reverse zone of movement;

said pedal being arranged relative to said floor plate in a manner which enables said individual to selectively access said first and second portions with the forward portion of said foot by pivoting said heel on said floor plate;

said pedal having said second portion thereof disposed laterally outboard of a side edge of said floor plate and having at least a portion of said first portion thereof disposed laterally inboard of said side edge of said floor plate.

9. An off-road vehicle as claimed in claim 8, wherein said transmission includes a hydraulic transaxle comprising a hydraulic pump, a hydraulic motor, and an output shaft for transmitting the output of said pump and motor to said at least one ground wheel.

10. An off-road vehicle as claimed in claim 9, wherein said hydraulic pump comprises a speed control input shaft operatively connected to said pedal and normally maintained in a central neutral position, said speed control input shaft being movable in opposite directions from said central neutral position towards 1) a forward position when said pedal is moved into said forward zone for causing said transmission to drive said at least one ground wheel for forward motion of said vehicle, and 2) a reverse position when said pedal is moved into said reverse zone for causing said transmission to drive said at least one ground wheel for reverse motion of said vehicle.

11. An off-road vehicle as claimed in claim 10, further comprising a centering assembly operatively connected to said speed control input shaft for normally maintaining said input shaft in said central neutral position.

12. An off-road vehicle as claimed in claim 11, wherein said centering assembly comprises:

an anchor brace;

a lever connected to and pivotable about said speed control input shaft such that pivotal movement of said lever translates into rotational movement of said input shaft; and a coil spring connected to said anchor brace and said lever;

said the connections between the coil spring_ and the anchor brace, the coil spring and the lever, and the input shaft and the lever all lying in a single plane substantially parallel to a longitudinal axis of said input shaft when said shaft is in said neutral central position, and at least one of the connections diverging away from said single plane as said input shaft diverges away from said neutral central position towards either said forward or reverse positions.

13. An off-road vehicle as claimed in claim 10, further comprising a control rod for operatively connecting said pedal to said speed control input shaft and a spring assembly operatively connected to said pedal, through said control rod, for normally maintaining said pedal in said neutral zone.

14. A control linkage for controlling movement Of a speed control input shaft of a hydrostatic transmission, said input shaft being rotatable between forward, neutral and reverse positions, said control linkage comprising:

an anchor brace;

a lever connected to and pivotable about said speed control input shaft such that pivotal movement of said lever translates into rotational movement of said speed control input shaft; and a coil spring connected to said anchor brace and said lever;

a pedal operatively connected with said speed control input shaft and pivotally mounted for movement i) from a neutral zone to a forward zone to effectuate rotational movement of said input shaft from said neutral position to said forward position, and ii) from said neutral zone to a reverse zone to effectuate rotational movement of said input shaft from said neutral position to said reverse position;

a control rod connecting said pedal to said lever so that pivotal movement of said pedal translates into pivotal movement of said lever and thus rotational movement of said speed control input shaft;

the connections between the coil spring and the anchor brace, the coil spring and the lever, and the speed control input shaft and the lever all lying in a single plane substantially parallel to a longitudinal axis of said input shaft when said shaft is in said neutral central position, said coil spring operably biasing said shaft into said neutral central position and said pedal into said neutral zone, and said pedal being selectively movable by force applied by an individual against the bias of said coil spring i) from said neutral zone to said forward zone so as to cause movement of said speed control input shaft from said neutral central position to said forward position or ii) from said neutral zone to said reverse zone so as to cause movement of said speed control input shaft from said neutral central position to said reverse position, at least one of the connections diverging away from said single plane as said input shaft diverges away from said neutral central position towards either said forward or reverse positions, and said coil spring being operable to return said input shaft to said central neutral position and said pedal to said neutral zone when said force applied by the individual is discontinued.

15. A switching mechanism for a hydrostatic transaxle check valve of an off road vehicle, said off-road vehicle having a frame, a console, an operator seat, a steering wheel, an engine, and a variable speed transmission coupled for driving at least one of a plurality of groundwheels, said hydrostatic check valve being switchable by actuation of a push-button between opened and closed positions to convert the vehicle between push and drive modes respectively, said switching mechanism comprising:

an operating rod movable between first and second positions and having a manually engageable portion at a first end thereof, at least said manually engageable portion being normally disposed exteriorly of said console and beneath said seat, said seat being pivotable to permit manual access to said manually engageable portion;

a cam member rotatable about an axis and having an eccentric portion capable of operational engagement with said push-button for switching said hydrostatic check valve between said opened and closed positions;

a biasing member operatively coupling said operating rod and said cam member so that movement of said operating rod between said first and second positions causes rotation of said cam member in a manner which forces said eccentric portion into operational engagement with said push-button for switching said hydrostatic check valve between said opened and closed positions.

16. A switching mechanism as claimed in claim 15, wherein said operating rod extends through an opening in said console, said opening being defined by an edge, and wherein a first bent portion of said operating rod is latched onto said edge when said hydrostatic check valve is in said closed position.

17. A switching mechanism as claimed in claim 16, wherein a second bent portion of said operating rod is latched onto said edge when said hydrostatic check valve is in said opened position.

18. A switching mechanism as claimed in claim 15, wherein said operating rod extends through a slot in said frame, said operating rod having a stamped flat for orienting said rod in said slot.

19. A switching mechanism as claimed in claim 15, wherein said biasing member comprises a coil spring.

* * * * *